(12) United States Patent
Behrens

(10) Patent No.: US 8,490,499 B2
(45) Date of Patent: Jul. 23, 2013

(54) SENSOR SYSTEM FOR ASCERTAINING A TORQUE AND FOR INDEX DETECTION

(75) Inventor: Holger Behrens, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 12/927,571

(22) Filed: Nov. 17, 2010

(65) Prior Publication Data
US 2011/0126639 A1 Jun. 2, 2011

(30) Foreign Application Priority Data
Nov. 27, 2009 (DE) .................. 10 2009 047 222

(51) Int. Cl.
*G01L 3/02* (2006.01)
(52) U.S. Cl.
USPC ..................................... 73/862.193
(58) Field of Classification Search
USPC ..................................... 73/862.193
See application file for complete search history.

(56) References Cited

U.S. PATENT DOCUMENTS

| 7,089,809 B2 * | 8/2006 | Nakane et al. | 73/862.331 |
| 7,602,173 B2 * | 10/2009 | Reichert | 324/207.13 |
| 2004/0194560 A1 * | 10/2004 | Froehlich et al. | 73/862.333 |

FOREIGN PATENT DOCUMENTS

DE  10 2005 031 086  1/2007

\* cited by examiner

*Primary Examiner* — Lisa Caputo
*Assistant Examiner* — Octavia D. Hollington
(74) *Attorney, Agent, or Firm* — Kenyon & Kenyon LLP

(57) ABSTRACT

A torque sensor system having an index function and ascertaining a torque between an input shaft and an output shaft connected to each other via a torsion bar, includes: a magnetic unit having a magnetic pole wheel for generating a magnetic field, the magnetic unit being rigidly connected to one of the two shafts; a flux ring unit having a flux ring system for converting and conducting the magnetic flux generated by the magnetic unit, the flux ring unit being rigidly connected to the other shaft; and a sensor unit having at least one first magnetic field-sensitive sensor element for sensing changes in the magnetic flux through the flux ring system, the sensor unit being mounted in a stationary manner relative to the flux ring unit. The index function is implemented with the aid of an index magnet and a further magnetic field-sensitive sensor element.

7 Claims, 2 Drawing Sheets

SENSOR SYSTEM FOR ASCERTAINING A TORQUE AND FOR INDEX DETECTION

BACKGROUND OF THE INVENTION

1. Field of the Invention

The present invention relates to a sensor system for ascertaining a torque between an input shaft and an output shaft which are connected to each other via a torsion bar.

2. Description of the Related Art

For this purpose, the sensor system includes a magnetic unit having a magnetic pole wheel for generating a magnetic field, the magnetic unit being rigidly connected to one of the two shafts; a flux ring unit having a flux ring system for converting and conducting the magnetic flux generated by the magnetic unit, the flux ring unit being rigidly connected to the other shaft; and a sensor unit having at least one first magnetic field-sensitive sensor element for sensing changes in the magnetic flux through the flux ring system, the sensor unit being mounted in a stationary manner in relation to the flux ring unit.

A sensor system of this type is described in published German patent application document DE 10 2005 031 086 A1. Its structure and the interaction between the individual components are illustrated by the exploded view in FIG. 1, in which neither the two shafts nor the torsion bar are represented for reasons of clarity. Magnetic pole wheel 11 of magnetic unit 1 is connected to one of the two shafts and situated concentrically to the shaft axis. It includes an alternating system of ring section-shaped north pole and south pole magnetic elements 12 and 13.

Flux ring system 20 of flux ring unit 2 includes an inner flux ring 21 and an outer flux ring 22 made of a ferromagnetic material. These two flux rings 21, 22 are connected to the other shaft, so that they are oriented concentrically to each other and to the shaft axis, i.e., parallel to magnetic pole wheel 11. Inner flux ring 21 is provided with teeth 23 which face outward from the shaft in the radial direction, while outer flux ring 22 is provided with teeth 24 which face inward toward the shaft in the radial direction. The two flux rings 21, 22 are situated and designed in such a way that their teeth 23 and 24 engage with each other alternatively and are spaced the same axial distance apart from magnetic pole wheel 11. The geometry of teeth 23, 24 as well as the distance between teeth 23, 24 are adapted to the ring section shape and the size of magnetic pole elements 12 and 13.

A sensor unit 3 having a magnetic field-sensitive sensor element 30 forms the third component of the known sensor system. This sensor unit 3 is mounted in a stationary manner in relation to flux ring system 20. It includes two magnetic flux-collecting elements 31, 32 which are used to selectively supply the magnet flux through flux ring system 20 to sensor element 30. For this purpose, magnetic flux-collecting elements 31 and 32 are situated adjacent to each other, one on the circumference of inner flux ring 21 and one on the circumference of outer flux ring 22. Sensor element 30 is located between magnetic flux-collecting elements 31 and 32, which are provided in this area with special formations 33 for sensor element 30.

If a torque is now generated between the input shaft and the output shaft, the torsion bar is twisted and magnetic pole wheel 11 is twisted against flux ring system 20. This produces a change in magnetic field strength at the location of sensor element 30. This change in magnetic field strength is converted to an electrical measuring signal with the aid of sensor element 30.

In the automotive industry, torque sensors of the type discussed herein are used, for example, in connection with steering systems. The torque-measuring signal is used in this case as a manipulated variable for an electrical power steering system. In this connection, it proves to be advantageous if the torque sensor is additionally equipped with an index function so that it detects the position of the steering wheel or steering column for driving straight ahead. This corresponds to a specified angle position of the input shaft or the output shaft, namely the 0° angle position.

Torque sensor systems having an index function of this type are already used in practice. Thus, methods are known for implementing the index function with the aid of mechanical switching elements, for example microswitches or gears.

Furthermore, a sensor concept is presented which provides a contactless implementation of the index function in the form of a magnetically operated switching element. This switching element is usually a digital Hall IC which is situated on a printed circuit board within the sensor unit. This digital Hall IC is switched with the aid of an index magnet which is attached to a defined position on the circumference of the flux ring unit. When the index magnet rotates past the sensor unit, the digital Hall IC emits a switching signal which indicates that the steering wheel is located in the position defined by the index magnet.

The contactless variant proves to be advantageous, compared to the mechanical implementation of the index function, since the index magnet and the switching IC are not placed under any mechanical load and are therefore also not subject to wear. However, the structure of the known sensor system having a magnetically implemented index function is relatively complex, in particular where the position of the index magnet and the mounting of the switching IC are concerned. The index magnet in this case is namely situated on the flux ring unit in such a way that it has minimal influence on the magnetic flux produced by the magnetic pole wheel in the flux rings. Due to this arrangement, the digital switching IC must be situated at a relatively great distance from the sensor element used to sense the changes in the magnetic flux through the flux rings. In practice, the switching IC is therefore mounted on the bottom of a printed circuit board, with the aid of a special support, while the magnetic field-sensitive sensor element is situated on the front of the printed circuit board.

BRIEF SUMMARY OF THE INVENTION

The present invention provides a torque sensor system in which the index function may be implemented in a contactless manner which involves relatively little assembly effort.

For this purpose, the sensor system according to the present invention includes at least one index magnet which is mounted on the flux ring unit in the area of the magnetic field generated by the magnetic unit. In addition, the sensor unit of the sensor system includes at least one further magnetic field-sensitive sensor element which is situated on a circumference in the area of the flux ring system, together with the first sensor element, but at a distance therefrom. Furthermore, means are provided for evaluating the sensor signals of the first and further sensor elements.

According to the present invention, it is recognized that the two sensor functions, the torque detection function and the index function need not be implemented independently of each other using different components of the sensor system, but rather that the position of the index magnet may also be ascertained by at least two equivalent magnetic field-sensitive sensor elements, such as those used for determining torque, on the basis of the sensor signals. For this purpose, the index magnet is dimensioned and situated in such a way that it noticeably influences the magnetic flux produced by the magnetic pole wheel within the flux ring system. Since the disturbance in the magnetic flux produced by the index magnets is a function of the location, the at least two magnetic field-sensitive sensor elements are situated at a distance from each other according to the present invention. In this case, the position of the index magnet may be calculated from the sensor signals, and the offset shift in the torque signal produced by the index magnet may be compensated.

According to the present invention, the position of the index magnet is thus not implemented with the aid of an additional mechanical or contactless switch which is used exclusively for the index function, but rather with the aid of a further magnetic field-sensitive sensor element which supplies a measuring signal even if the shaft equipped with the flux ring unit is not in the angle position defined by the index magnet. This additional measuring signal supplies redundant information for ascertaining the torque and thus contributes to the reliability and availability of the torque detection system. The concept of the index function according to the present invention may also very easily be structurally integrated into a torque sensor system, forming the basis for the present invention. In contrast to the contactlessly operating switching IC known from the related art, the further sensor element may be situated together with the at least one first sensor element on the front of a common printed circuit board in the sensor unit. No special support elements are necessary for this purpose.

In principle, there are different options for implementing the sensor system according to the present invention, the individual components each having to be structurally adapted to each other in such a way that the magnetic pole wheel of the magnetic unit and the flux ring system together form a magnetic flux circuit. The sensor elements of the sensor unit must also be situated within this magnetic flux circuit in such a way that they detect the magnetic flux in at least two measuring locations which are spaced a distance apart.

In an advantageous example embodiment of the present invention, the flux ring system includes an inner flux ring and an outer flux ring, which are mounted concentrically to the shaft axis and parallel to the magnetic pole wheel. The inner flux ring includes ferromagnetic teeth which face outward from the shaft in the radial direction, while the outer flux ring is provided with ferromagnetic teeth which face inward toward the shaft in the radial direction, so that the teeth of the inner and outer flux rings engage with each other. In this variant, the magnetic information of the magnetic pole wheel is tapped by the radially oriented teeth of the flux ring system. In this structure, axial displacements between the magnetic pole wheel, the flux rings and the sensor elements have an only comparatively small influence on the quality of signal detection. In addition, all components of the sensor system in this case may be mounted starting from one end of the shaft system.

In an example embodiment of the sensor system according to the present invention, the sensor unit includes at least one magnetic flux-collecting element for each flux ring of the flux ring system, the magnetic flux-collecting elements being situated adjacent to each other. The two sensor elements are then situated in the area of the magnetic flux-collecting elements. The magnetic flux is selectively supplied to the two sensor elements in this manner. The quality of signal detection may be substantially increased thereby. To support the index function, the magnetic flux-collecting elements and the index magnet may also be designed in such a way that the influence of the index magnet on the magnetic flux in the flux ring system is essentially sensed only if the index magnet is located in the area of the magnetic flux-collecting elements. Otherwise, the influence of the index magnet on the sensor signal is so weak that is negligible.

The use of a flux ring system having radial teeth enables particularly good measuring results to be achieved with the aid of magnetic flux-collecting elements, each of which is implemented in the form of two concentrically situated and at least magnetically interconnected ring sections made of a ferromagnetic material, one ring section being situated on the inside of the corresponding flux ring and the other ring section being situated on the outside of the corresponding flux ring. Each of the two flux rings may then freely rotate together with the shaft between the two ring sections of its stationary magnetic flux-collecting element. The first and further sensor elements in this case are situated in the area between the outer ring section of the magnetic flux-collecting element of the inner flux ring and the inner ring section of the magnetic flux-collecting element of the outer flux ring.

Supplying the magnetic flux to the sensor elements may be easily further improved in this case by the fact that the outer ring section of the magnetic flux-collecting element of the inner flux ring and the inner ring section of the magnetic flux-collecting element of the outer flux ring have special formations for the sensor elements to minimize the air gap between these ring sections and the collecting elements. The formations may also be designed in such a way that the sensor elements are in physical contact with the ring sections.

Linear Hall sensors are preferably used as the sensor elements.

As explained above, the structure of the sensor system described above according to the present invention is based on a new index detection concept. In addition to a corresponding sensor system, a method is therefore also claimed for ascertaining the torque between an input shaft and an output shaft, which are connected to each other via a torsion bar, and for detecting a predefined angle position of the output shaft (index function). According to this method, a magnetic flux is generated in a flux ring system which is rigidly connected to the output shaft, using a magnetic pole wheel which is rigidly connected to the input shaft. With the aid of an index magnet on the flux ring system, a magnetic interference signal is furthermore generated within the flux ring system, this interference signal being superimposed on the magnetic flux of the magnetic pole wheel and being detectable within a determined angle position range of the output shaft in the predefined measuring locations. The resulting magnetic flux is detected in at least two permanently predefined measuring locations which are spaced a distance apart in the area of the flux ring system. A torque signal and the position of the index magnet are then ascertained from these two measuring signals.

DETAILED DESCRIPTION OF THE INVENTION

Figure 1:
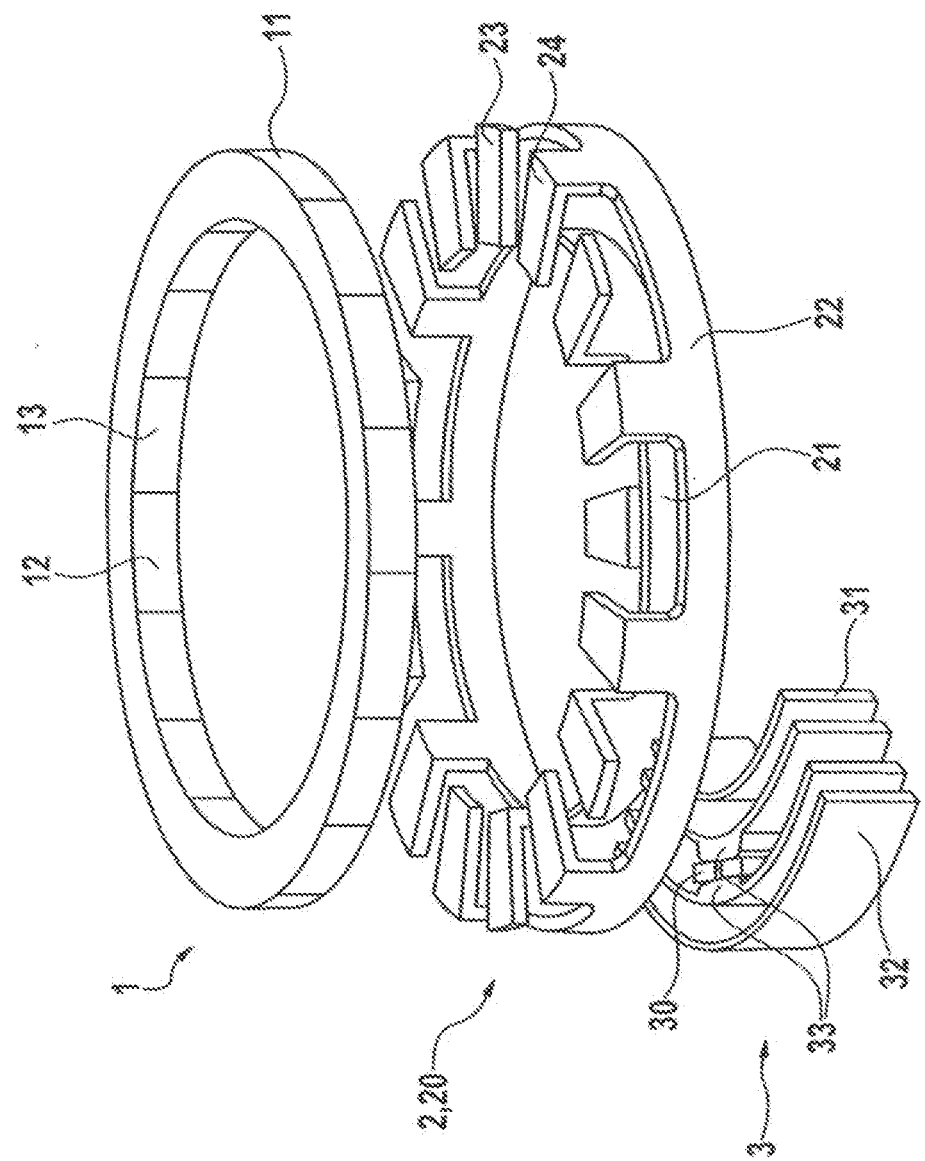
FIG. 1 shows an exploded view of the individual components of a sensor system for detecting torque, which is known from the related art.
Figure 2:
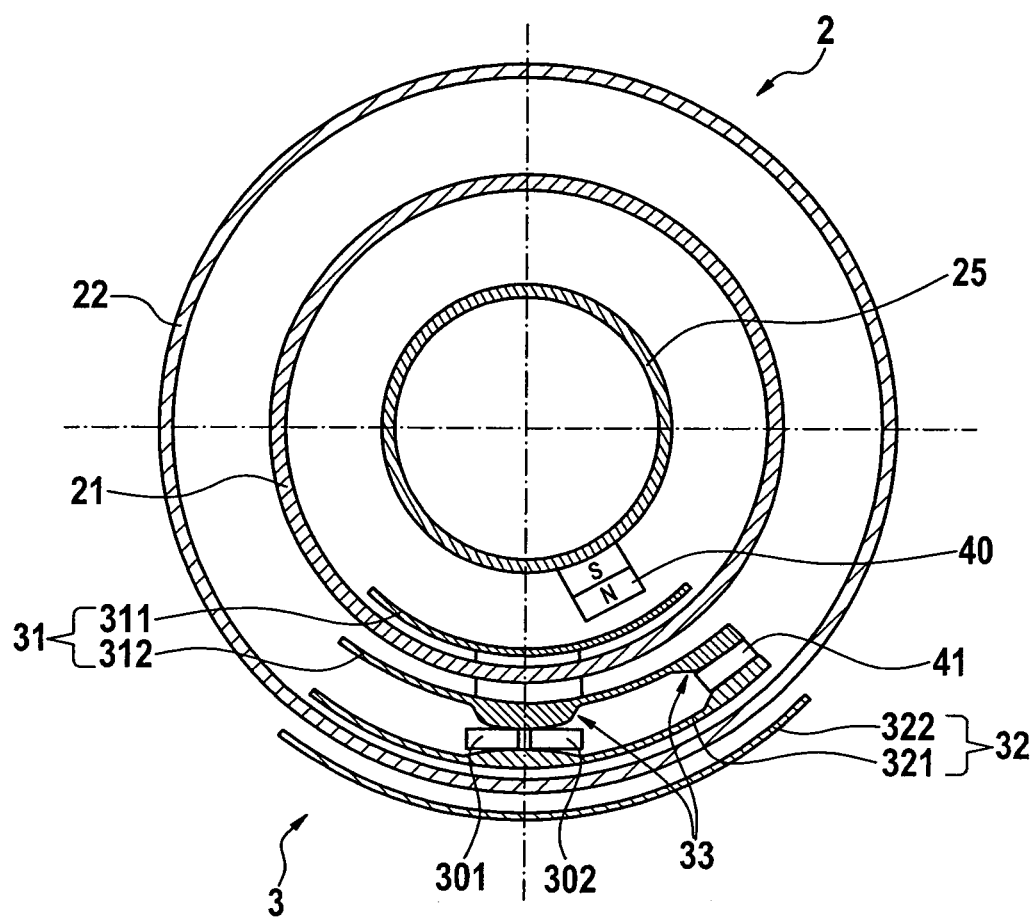
FIG. 2 shows a schematic sectional representation of a sensor system 100 according to the present invention.

Sensor system 100 illustrated in FIG. 2 is structured similarly to the sensor system illustrated in FIG. 1, but the present invention additionally has index detection means, namely an index magnet 40 and an additional magnetic field-sensitive sensor element 41. The present invention requires specific positioning of these components within sensor system 100, which is illustrated particularly effectively by the schematic sectional representation in FIG. 2.

The sectional plane is oriented perpendicularly to the shaft axis and passes through flux ring unit 2, which includes inner flux ring 21 and outer flux ring 22. The two flux rings 21 and 22 are mounted concentrically to the shaft axis and parallel to the magnetic pole wheel of the magnetic unit, which is not illustrated here, since it is situated above the section plane. As shown in FIG. 1, inner flux ring 21 is provided with ferromagnetic teeth which face outward from the shaft in the radial direction, while outer flux ring 22 is provided with ferromagnetic teeth which face inward toward the shaft in the radial direction, so that the teeth of both flux rings 21 and 22 engage with each other. Flux ring unit 2 also includes a sleeve 25 which is used for attachment on or to the shaft. Therefore, sleeve 25 and flux ring system 20 together rotate along with the shaft. Index magnet 40 is mounted on sleeve 25 of flux ring unit 2 in such a way that it is located in the area of the magnetic field generated by the magnetic unit.

In contrast to flux ring unit 2 having index magnet 40, sensor unit 3 of sensor system 100 is mounted in a stationary manner. It includes a magnetic flux-collecting element 31 for inner flux ring 21 and a magnetic flux-collecting element 32 for outer flux ring 22. Each of the two magnetic flux-collecting elements 31 and 32 is implemented in the form of two concentrically situated and both mechanically and magnetically interconnected ring sections 311, 312 and 321, 322 made of a ferromagnetic material. The two ring sections 311, 312 and 321, 322 of a magnetic flux-collecting element 31 and 32 are situated on the inside and on the outside of corresponding flux ring 21 and 22 in such a way that each flux ring 21 and 22 is able to rotate freely together with the shaft between the two ring sections 311, 312 and 321, 322 of its stationary magnetic flux-collecting element 31 or 32. FIG. 2 also illustrates the adjacent situation of the two magnetic flux-collecting elements 31 and 32 on the circumference of the two flux rings 21 and 22.

In the exemplary embodiment illustrated herein, two special formations 33, which together form two supports for sensor elements 301, 302 and 41, are located on outer ring section 312 of magnetic flux-collecting element 31 of inner flux ring 21 and on inner ring section 321 of magnetic flux-collecting element 32 of outer flux ring 22, so that these sensor elements are situated in the area between outer ring section 312 of magnetic flux-collecting element 31 of inner flux ring 21 and inner ring section 321 of magnetic flux-collecting element 32 of outer flux ring 22. One of the two supports is situated in the center area of the two magnetic flux-collecting elements 31, 32 and designed for two sensor elements 301 and 302, which are situated immediately next to each other. The other support is spaced a distance apart from the first holder in the end area of the two magnetic flux-collecting elements 31 and 32, and it is designed for only one further sensor element 41.

All three sensor elements 301, 302 and 41 are linear Hall sensors which are used to sense changes in the magnetic flux through flux ring system 20 which are produced by a rotation between the magnetic unit and flux ring unit 2.

Since sensor elements 301 and 302 are of the same type and are situated immediately next to each other, they supply very similar measuring signals which are only minimally phase-shifted. This system of two equivalent sensor elements in a single measuring location increases the reliability and failure-safety of the measuring signal detection method for determining torque, but it does not supply any additional information for index detection.

For this purpose, sensor system 100 includes further sensor element 41, which is situated at a substantial distance from the two sensor elements 301 and 302 in the area of magnetic flux-collecting elements 31 and 32. On the one hand, this produces a substantial phase shift between the measuring signals of sensor elements 301 and 302 and the measuring signal of sensor element 41. On the other hand, the disturbance in the magnetic flux in flux ring unit 2 caused by index magnet 40 has a substantially different effect at the measuring location of sensor element 41 than at the measuring location of sensor elements 301 and 302. The measuring signal of sensor element 41 thus supplies additional information which may be used to determine both the influence of index magnet 40 on the measuring signals and the position of index magnet 40 in relation to stationary sensor elements 301, 302 and 41. The evaluation of the measuring signals required for this purpose is explained in greater detail below.

The torque signal is usually ascertained on the basis of the signal level of the measuring signals of linear Hall sensors 301 and 302, provided that these sensors detect only the magnetic flux in the flux ring system produced by the magnetic unit. Within the scope of sensor system 100 according to the present invention, however, this signal level is not determined solely by the rotation between the magnetic unit and flux ring unit 2, but also by index magnet 40. In this case, index magnet 40 is advantageously dimensioned in such a way that it produces a deviation of the measuring signal from the setpoint signal—which corresponds to the applied torque—only if the index magnet is located in the area of magnetic flux-collecting elements 31, 32. In this case, the influence of index magnet 40 results in an error in ascertaining the torque. The magnitude of this error depends on the distance between index magnet 40 and particular sensor element 301 or 302. The deviation of the measuring signal from the setpoint signal namely increases until index magnet 40 is located in the center area of magnetic flux-collecting elements 31, 32, directly opposite sensor elements 301 and 302. The error is the greatest in this location. The correlation between angle position $\psi$ and error $f(\psi)$ may be very effectively described by the parabolic equation $$f(\psi)=a\psi^2+b\psi+c$$

where:
  a is an estimated value for the index width, which is determined by the strength of the index magnet, the temperature, and the air gap;
  b is given by the distance between the two measuring positions, namely the position of sensor elements 301, 302 and the position of further sensor element 41;
  c corresponds to the signal level of the setpoint signal; and
  $\psi$ corresponds to the index position.

With the aid of sensor elements 301, 302 and sensor element 41, two points of this error function may be ascertained, namely points for angle positions $\psi$ corresponding to the measuring positions of these sensor elements. This makes it possible to determine signal level c of the setpoint signal, and equation $f(\psi)$ may be solved according to $\psi$.

The following cosine equation supplies an equally good description of the correlation between angle position $\psi$ and error $f(\psi)$ $$f(\psi)=b\,\cos(\psi)+c$$

in this case, b corresponds to the maximum error produced by the index magnet;

c corresponds to the signal level of the setpoint signal; and

ψ corresponds to the index position.

With the aid of the measuring signals of sensor elements 301, 302 and sensor element 41, signal level c of the setpoint signal may again be determined, and equation f(ψ) may be solved according to ψ.

What is claimed is:

1. A sensor system for ascertaining a torque between an input shaft and an output shaft connected to each other by a torsion bar, the sensor system comprising:
    a magnetic unit having a magnetic pole wheel configured to generate a magnetic field, the magnetic unit being rigidly connected to one of the input shaft or the output shaft;
    a flux ring unit having a flux ring system configured to convert and conduct a magnetic flux generated by the magnetic unit, the flux ring unit being rigidly connected to the other of the input shaft or the output shaft; and
    a sensor unit having at least one first magnetic field-sensitive sensor element configured to detect changes in the magnetic flux through the flux ring system, the sensor unit being mounted in a stationary manner relative to the flux ring unit, the sensor unit having at least one further magnetic field-sensitive sensor element, wherein the first magnetic field-sensitive sensor element and the further magnetic field-sensitive sensor element are situated apart on a circumference in the area of the flux ring system;
    at least one index magnet mounted on the flux ring unit in the area of the magnetic field generated by the magnetic unit; and
    an evaluation unit configured to evaluate sensor signals of the first and the further magnetic field-sensitive sensor elements.

2. The sensor system as recited in claim 1, wherein the flux ring system includes an inner flux ring and an outer flux ring mounted concentrically to the shaft axis and parallel to the magnetic pole wheel, wherein the inner flux ring is provided with ferromagnetic teeth facing outward from the shaft axis in the radial direction and the outer flux ring is provided with ferromagnetic teeth facing inward toward the shaft axis in the radial direction such that the ferromagnetic teeth of the inner and outer flux rings engage with each other.

3. The sensor system as recited in claim 2, wherein the sensor unit includes a magnetic flux-collecting element for each flux ring of the flux ring unit, the magnetic flux-collecting elements being situated adjacent to each other on the circumference of the associated flux ring, and wherein the first magnetic field-sensitive sensor element and the further magnetic field-sensitive sensor element are situated in the area of the magnetic flux-collecting elements.

4. The sensor system as recited in claim 3, wherein the magnetic flux-collecting elements include a ferromagnetic material and are configured in the form of two concentrically situated ring sections interconnected at least magnetically, an inner ring section being situated on the inside of the associated flux ring and an outer ring section being situated on the outside of the associated flux ring such that each flux ring freely rotates together with an associated one of the input shaft or the output shaft between the inner and outer ring sections of the associated magnetic flux-collecting element, and wherein the first magnetic field-sensitive sensor element and the further magnetic field-sensitive sensor element are situated in the area between the outer ring section of the magnetic flux-collecting element of the inner flux ring and the inner ring section of the magnetic flux-collecting element of the outer flux ring.

5. The sensor system as recited in claim 4, wherein at least the outer ring section of the magnetic flux-collecting element of the inner flux ring and the inner ring section of the magnetic flux-collecting element of the outer flux ring have support structures for the first magnetic field-sensitive sensor element and the further magnetic field-sensitive sensor element.

6. The sensor system as recited in claim 3, wherein the first magnetic field-sensitive sensor element and the further magnetic field-sensitive sensor element are linear Hall sensors.

7. A method for ascertaining a torque between an input shaft and an output shaft connected to each other by a torsion bar, and for detecting a predefined angle position of the output shaft, the method comprising:
    providing a sensor system including:
        a magnetic unit having a magnetic pole wheel configured to generate a magnetic field, the magnetic unit being rigidly connected to one of the input shaft or the output shaft;
        a flux ring unit having a flux ring system configured to convert and conduct a magnetic flux generated by the magnetic unit, the flux ring unit being rigidly connected to the other of the input shaft or the output shaft; and
        a sensor unit having at least one first magnetic field-sensitive sensor element configured to detect changes in the magnetic flux through the flux ring system, the sensor unit being mounted in a stationary manner relative to the flux ring unit, the sensor unit having at least one further magnetic field-sensitive sensor element, wherein the first magnetic field-sensitive sensor element and the further magnetic field-sensitive sensor element are situated apart on a circumference in the area of the flux ring system;
        at least one index magnet mounted on the flux ring unit in the area of the magnetic field generated by the magnetic unit; and
        an evaluation unit configured to evaluate sensor signals of the first and the further magnetic field-sensitive sensor elements;
    generating a magnetic flux in the flux ring system rigidly connected to the output shaft, using the magnetic pole wheel rigidly connected to the input shaft;
    generating a magnetic interference signal within the flux ring system with the aid of the index magnet on the flux ring unit;
    superimposing the generated interference signal on the magnetic flux of the magnetic pole wheel, wherein the interference signal is detectable within a determined angle position range of the output shaft in predefined measuring locations;
    detecting, by the sensor unit, a resulting magnetic flux in at least two fixedly predefined measuring locations spaced apart in the area of the flux ring system; and
    ascertaining, by the evaluation unit, a torque signal and the position of the index magnet from the detected resulting magnetic flux in the at least two fixedly predefined measuring locations.

* * * * *